No. 725,609. PATENTED APR. 14, 1903.
J. W. WOLFE.
ORE SEPARATOR.
APPLICATION FILED MAR. 27, 1902.
NO MODEL. 3 SHEETS—SHEET 1.
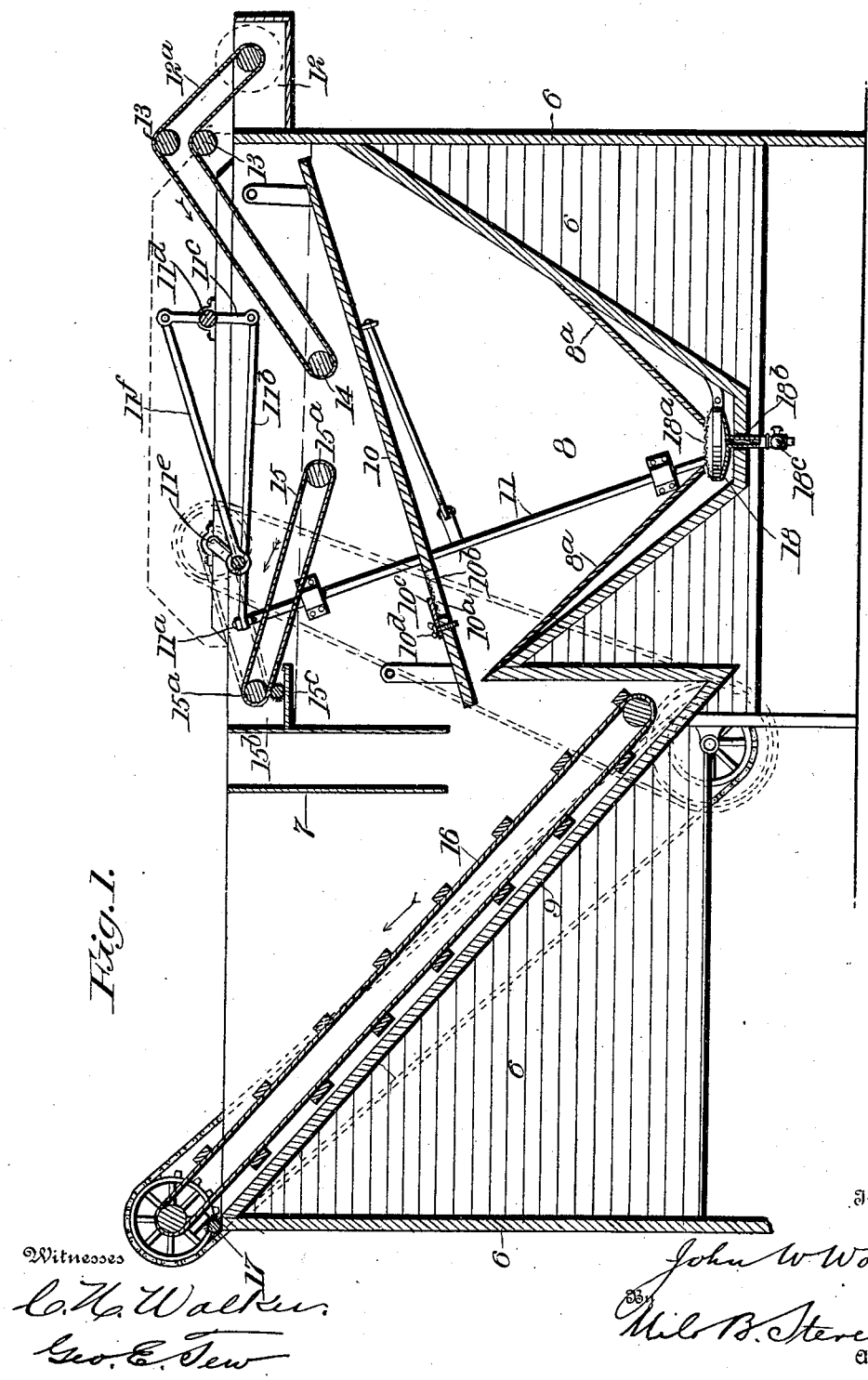

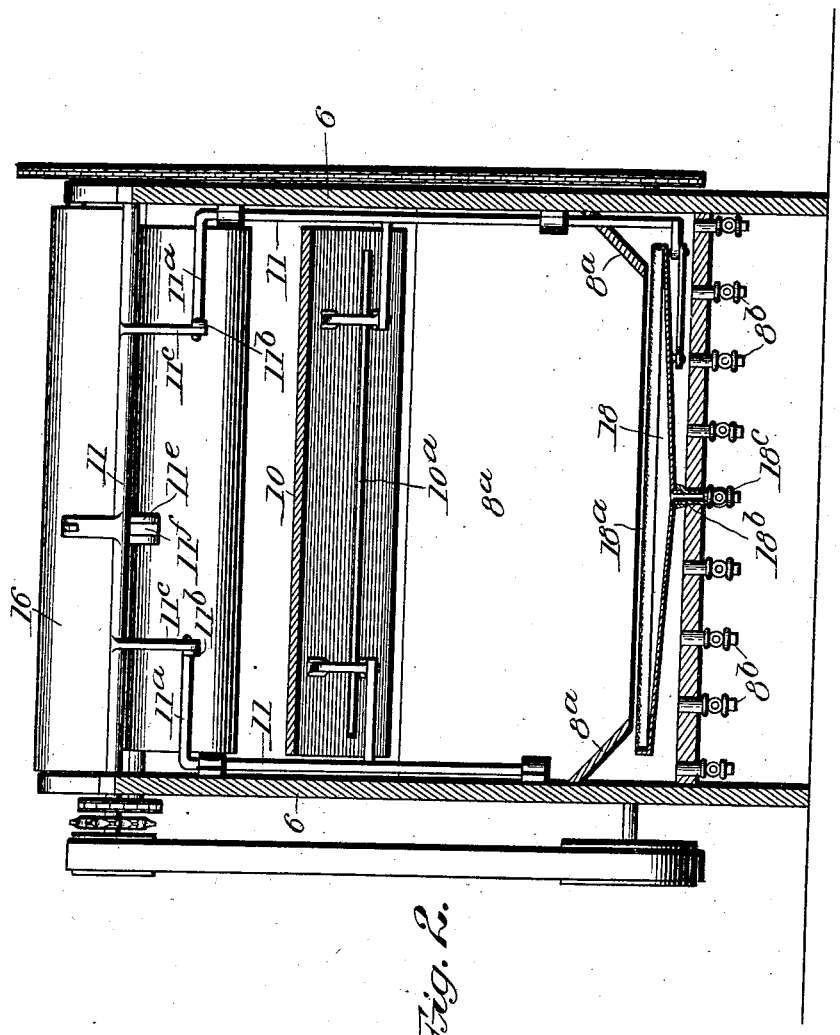

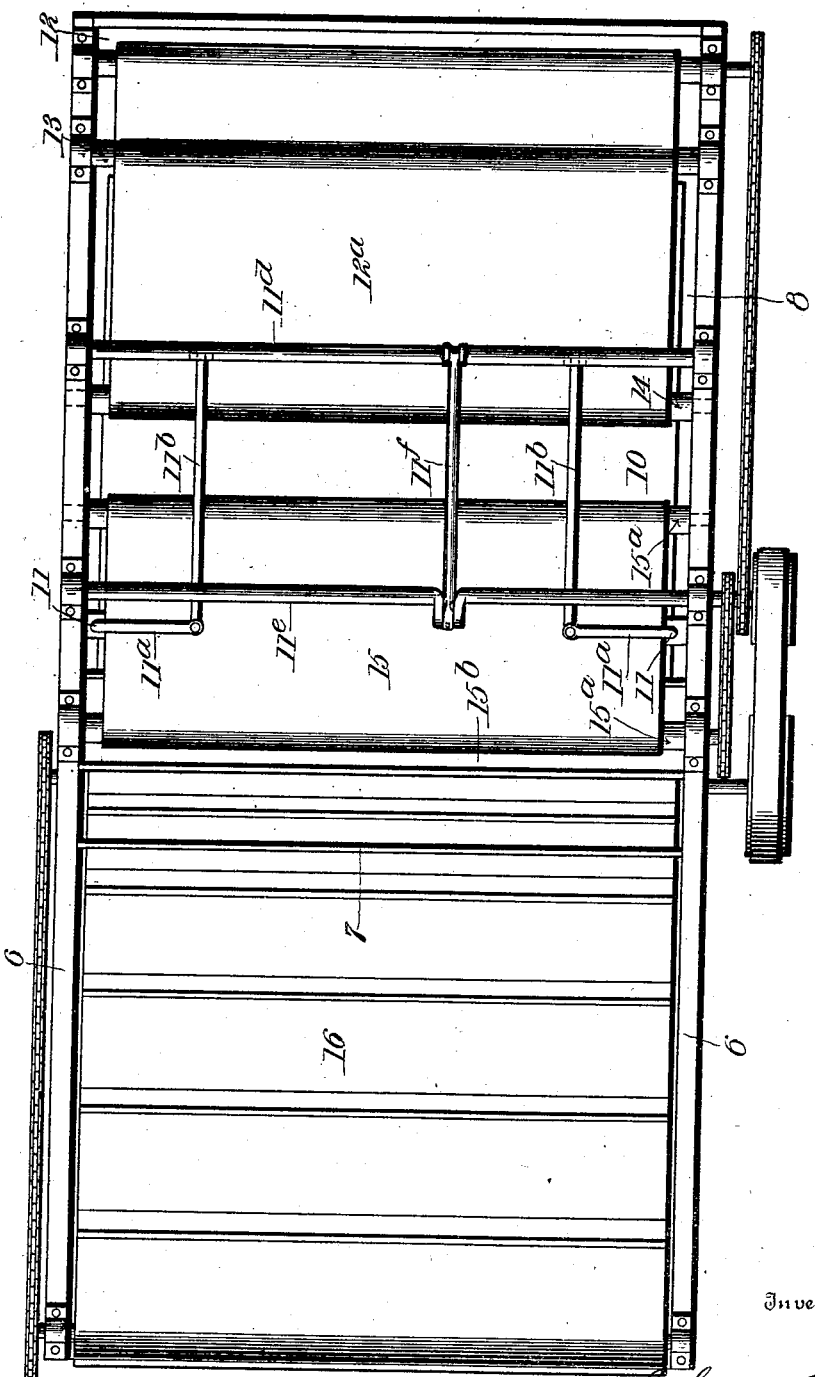

UNITED STATES PATENT OFFICE.

JOHN W. WOLFE, OF RANDOLPH, IOWA.

ORE-SEPARATOR.

SPECIFICATION forming part of Letters Patent No. 725,609, dated April 14, 1903.

Application filed March 27, 1902. Serial No. 100,168. (No model.)

*To all whom it may concern:*

Be it known that I, JOHN W. WOLFE, a citizen of the United States, residing at Randolph, in the county of Fremont and State of Iowa, have invented certain new and useful Improvements in Ore-Separators; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a machine for separating precious metals, such as gold, and is particularly useful in the separation of finely-divided or "flour" free gold from the sand and other earth in which it is found in a natural state. This is accomplished by saturating or mixing the ore with oil and then conveying the same into a tank of brine thickened by the addition of clay or other earth and having a layer of oil floating on the top thereof. When this is done, the flour-gold will separate from the ore and float on top of the brine in the tank and may be skimmed or gathered therefrom in a nearly-pure state.

The machine hereinafter described, and illustrated in the accompanying drawings, is designed for use in the performance of the process and also contains improved and novel features as a separator.

In the drawings, Figure 1 is a longitudinal vertical section of the machine. Fig. 2 is a vertical cross-section thereof. Fig. 3 is a top plan view.

Referring specifically to the drawings, 6 indicates the side and end walls of the tank, the floor of which is formed at one end into a hopper 8 and at the other end as an incline 9, leading to the top of one end wall.

In preparing the liquid above referred to I first fill the tank with water and then add enough earth or clay to make it decidedly muddy. To this I add a strong solution of common salt until a muddy brine is formed. A partition 7, extending below the surface of the water and across the tank, divides the latter into substantially two compartments, above the hopper and the incline, respectively. Into the compartment above the hopper I then pour a quantity of kerosene or other oil sufficient to form a comparatively thin layer on top of the brine.

The gold-bearing sand is placed in a feed-box 12, which is also filled with oil, which thoroughly saturates the ore. Thence it is conveyed to the machine by an endless apron $12^a$, which passes up over the edge of the tank on rollers 13, and thence down into the tank and around a roller 14 below the surface of the liquid. When the oil-impregnated ore strikes the brine, the flour-gold separates and floats thereon under the oil and is gathered therefrom by an endless canvas apron 15, traveling around rollers $15^a$, the lower end of the apron being close to the lower end of the feed-apron, the motion imparted causing the gold to travel from the latter to the former. It adheres to the apron 15 and is carried up and out of the liquid to a collecting-box $15^b$, into which it is swept from the apron by a revolving brush $15^c$. It may there be amalgamated or otherwise gathered.

The sand and heavier particles of gold sink to an inclined jigger-frame or pan, (indicated at 10.) This is submerged in the liquid and has near its lower end a slot $10^a$, covered by a sieve $10^b$ and adjustable in width by a metal strip or cover $10^c$ and set-screws $10^d$. The frame or pan is vibrated longitudinally by crank-arms and connecting-rods from rock-shafts 11, as hereinafter described.

The ore is shaken down over the pan and slot and the metal and heavier particles fall through the sieve while the ore is passing thereover. The tailings drop off the end of the pan onto an endless conveyer-belt 16, by which they are carried up and out of the liquid and beyond the end of the tank and are dislodged from the belt and discharged outside the tank by a revolving sand-brush 17.

The hopper 8 has false sides $8^a$, which form an inner or secondary hopper to direct the particles which pass through the slot to a pan 18, which is hung by flexible connections to the sides of the hopper 8 and is covered by a crowning or convex sieve $18^a$. The discharge end of the inner hopper $8^a$ is close to the sieve, which has the effect of spreading the sand upon the sieve and causing the escape in a thin sheet between the edge of said hopper and the sieve. The pan is vibrated by crank-and-rod connection with the shaft 11, and the vibration causes the gold to sink to and through the sieve and the remaining sand to fall therefrom onto the bottom of the hopper 8. The bottom of the pan inclines from each end to the middle, where a hole is formed leading by a flexible pipe $18^b$ to a stop-cock $18^c$, whence the gold may be drawn off as desired. The sand in the bottom of the hopper or the contents of the tank may be drawn off from the stop-cocks $8^b$.

The vertical rock-shafts 11 are supported in bearings at each side of the tank and are operated by crank-arms $11^a$ and rods $11^b$, connecting to crank-arms $11^c$ on a horizontal rock-shaft $11^d$, which is driven from a revolving shaft $11^e$ by crank and pitman $11^f$. The rollers for the conveyers and the shafts are mounted in suitable bearings on the tank and have the necessary drive-gear to move the conveyers in the directions indicated by the arrows, being such as any mechanic might supply, and no specific description thereof is thought to be necessary.

It may be remarked that the agitation of the water due to the vibration prevents the settling of the earthy matter and keeps the water muddy.

What I claim is—

1. In a separator, the combination with a tank adapted to contain liquid, of a submerged hopper therein, and a vibrating collecting-pan in the tank under the hopper, covered by a convex separating-sieve which is close to the lower edge of the hopper, forming a narrow escape-opening therebetween, substantially as described.

2. In a separator, in combination, a tank adapted to contain liquid, a submerged jigger-pan therein having an adjustable slot covered by a separating-sieve, over which the ore passes, and a metal-collecting vibrating pan under the slot, covered by a convex separating-sieve.

3. In a separator, in combination, a tank, a submerged inclined jigger therein having an adjustable separating-slot, a hopper below the same, a collecting-pan below the hopper, an inclined vibrating sieve covering the pan, and a discharge-conveyer below the lower end of the jigger, for the tailings.

In testimony whereof I affix my signature in presence of two witnesses.

JOHN W. WOLFE.

Witnesses:
  J. H. JOHNSTON,
  T. A. RHODE.